US011537660B2

(12) United States Patent
Carrier et al.

(10) Patent No.: US 11,537,660 B2
(45) Date of Patent: Dec. 27, 2022

(54) TARGETED PARTIAL RE-ENRICHMENT OF A CORPUS BASED ON NLP MODEL ENHANCEMENTS

(71) Applicant: International Business Machines Corporation, Armonk, NY (US)

(72) Inventors: Scott Carrier, New Hill, NC (US); Brendan Bull, Durham, NC (US); Paul Lewis Felt, Springville, UT (US); Dwi Sianto Mansjur, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 16/904,924

(22) Filed: Jun. 18, 2020

(65) Prior Publication Data
US 2021/0397654 A1    Dec. 23, 2021

(51) Int. Cl.
*G06F 16/9032*    (2019.01)
*G06F 16/23*    (2019.01)
*G06F 40/279*    (2020.01)

(52) U.S. Cl.
CPC .... *G06F 16/90332* (2019.01); *G06F 16/2386* (2019.01); *G06F 40/279* (2020.01)

(58) Field of Classification Search
CPC .......... G06F 16/90332; G06F 16/2386; G06F 40/279
See application file for complete search history.

(56) References Cited

U.S. PATENT DOCUMENTS 8,645,125 B2    2/2014  Liang et al.
2014/0074845 A1*  3/2014  Dimassimo ......... G06F 16/3325
                                   707/739
(Continued)

FOREIGN PATENT DOCUMENTS

CN      103823857 A    2/2017
CN      109783775 A    5/2019
(Continued)

OTHER PUBLICATIONS

Navarro-Galindo, The FLERSA tool: adding semantics to a web content management system, 2012, International Journal of Web International Systems, vol. 8, No. 1, p. 73-126 (Year: 2012).*
(Continued)

*Primary Examiner* — Sonia L Gay
(74) *Attorney, Agent, or Firm* — Cantor Colburn LLP; Kelsey M. Skodje

(57) ABSTRACT

Techniques for targeted partial re-enrichment include determining that at least one natural language processing (NLP) request is associated with at least one surface form, the NLP request being for a corpus, a database comprising preexisting annotations associated with the corpus. An index query related to the at least one surface form is performed to generate index query results, the index query results including identification of portions of the corpus affected by the NLP request. A scope of the NLP request related to the database is determined based on the index query results, the scope including identification of impacted candidate annotations of the preexisting annotations affected by the NLP request. An NLP service is performed on the corpus according to the scope and the portions, thereby resulting in updates. The updates are committed to the database associated with the corpus.

20 Claims, 6 Drawing Sheets

(56) References Cited

U.S. PATENT DOCUMENTS

| | | | |
|---|---|---|---|
| 2014/0278351 A1 | 9/2014 | Clark et al. | |
| 2019/0073357 A1 | 3/2019 | Scally et al. | |
| 2019/0286664 A1* | 9/2019 | Adams | G06F 16/38 |
| 2019/0317996 A1 | 10/2019 | Allen et al. | |

FOREIGN PATENT DOCUMENTS

| | | |
|---|---|---|
| CN | 107301173 B | 10/2019 |
| CN | 110458207 A | 11/2019 |
| CN | 109684448 A | 1/2021 |
| KR | 102098461 B1 | 4/2020 |
| WO | 2018034426 A1 | 2/2018 |
| WO | 2019160557 A1 | 8/2019 |

OTHER PUBLICATIONS

Hasibi, Semantic Search with Knowledge Bases, 2018, Norweian University of Science and Technology, whole document (Year: 2018).*

Fan et al., Evaluating the Impact of Dictionary Updates on Automatic Annotations Based on Clinical NLP Systems, 2019, AMIA Jt Summits Transl Sci Proc, PMID: 31259028; PMCID: PMC6568114., p. 714-721 (Year: 2019).*

International Search Report; International Application No. CN2021/099122; International Filing Date: Jun. 9, 2021; dated Sep. 8, 2021; 10 pages.

* cited by examiner

TARGETED PARTIAL RE-ENRICHMENT OF A CORPUS BASED ON NLP MODEL ENHANCEMENTS

BACKGROUND

The present invention generally relates to computer systems, and more specifically, to targeted partial re-enrichment of a corpus based on a natural language processing model enhancement on computer systems.

Natural language processing (NLP) is concerned with the interactions between computers and human (natural) languages, in particular how to program computers to process and analyze large amounts of natural language data. This natural language data is sometimes referred to as a corpus. In linguistics, a corpus or text corpus is a language resource consisting of a large and structured set of texts. NLP processing can occur on a large corpora resulting in many annotations associated with the corpora.

SUMMARY

Embodiments of the present invention are directed to targeted partial re-enrichment of a corpus based on natural language processing model enhancement on computer systems. A non-limiting example computer-implemented method includes determining that at least one natural language processing (NLP) request is associated with at least one surface form, the NLP request being for a corpus, a database including preexisting annotations associated with the corpus. The method includes performing an index query related to the at least one surface form to generate index query results, the index query results including identification of portions of the corpus affected by the NLP request. The method includes determining a scope of the NLP request related to the database based on the index query results, the scope including identification of impacted candidate annotations of the preexisting annotations affected by the NLP request. Also, the method includes causing a NLP service to be performed on the corpus according to the scope and the portions, thereby resulting in updates, and committing the updates to the database associated with the corpus.

In addition to one or more of the features described above or below, or as an alternative, further embodiments could include displaying a preview of the updates prior to committing the updates to the database.

In addition to one or more of the features described above or below, or as an alternative, further embodiments could include wherein the corpus comprises the at least one surface form.

In addition to one or more of the features described above or below, or as an alternative, further embodiments could include wherein the portions of the corpus affected by the NLP request comprise identification of at least one or more documents from a plurality of documents in the corpus.

In addition to one or more of the features described above or below, or as an alternative, further embodiments could include wherein the portions of the corpus affected by the NLP request comprise identification of at least one or more passages in documents in the corpus.

In addition to one or more of the features described above or below, or as an alternative, further embodiments could include wherein the updates comprise new annotations.

In addition to one or more of the features described above or below, or as an alternative, further embodiments could include wherein the updates comprise new annotations and modifications to the impacted candidate annotations.

In addition to one or more of the features described above or below, or as an alternative, further embodiments could include wherein causing the NLP service to be performed on the corpus according to the scope and the portions occurs in a shorter amount of time as compared to causing the NLP service to be performed over an entirety of the corpus.

In addition to one or more of the features described above or below, or as an alternative, further embodiments could include wherein the performing the index query and the determining the scope enable unilaterally provisioning computing capabilities for the committing the updates to the database associated with the corpus.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide a system and method for targeted partial re-enrichment of a corpus based on one or more enhancements to an NLP model. In one or more embodiments, when NLP model enhancements can be traced back to surface forms in the text of the corpus, re-enrichment can occur on a targeted set of passages rather than the entire corpus. The surface form of a word is the form of a word as it appears in the text of the corpus. Re-enriching an entire corpus to take advantage of enhancements to an NLP model is an expensive computer computational process which can require a large amount of time, for example, days if the corpus contains many documents (e.g., hundreds, thousands, or millions of documents). Instead of processing the entire corpus, one or more embodiments facilitate targeted enrichment of a corpus based on NLP edits that can be traced back to surface forms within the corpus, such as, for example, adding/removing a surface form from a dictionary and/or making modifications to annotations built on top of other annotations (attributes). When employing the targeted enrichment technique, one or more embodiments provide the option of previewing the impact of cartridge enhancements over a corpus without actually applying the re-enriched data until the domain expert (e.g., operator) is satisfied with the NLP edits and desires to re-enrich the corpus. A cartridge is a collective term for an entire set of deployable assets for an NLP pipeline. The cartridge can contain and/or refer to the services to use, configurations for those services, dictionaries, filters, etc.

Figure 1:
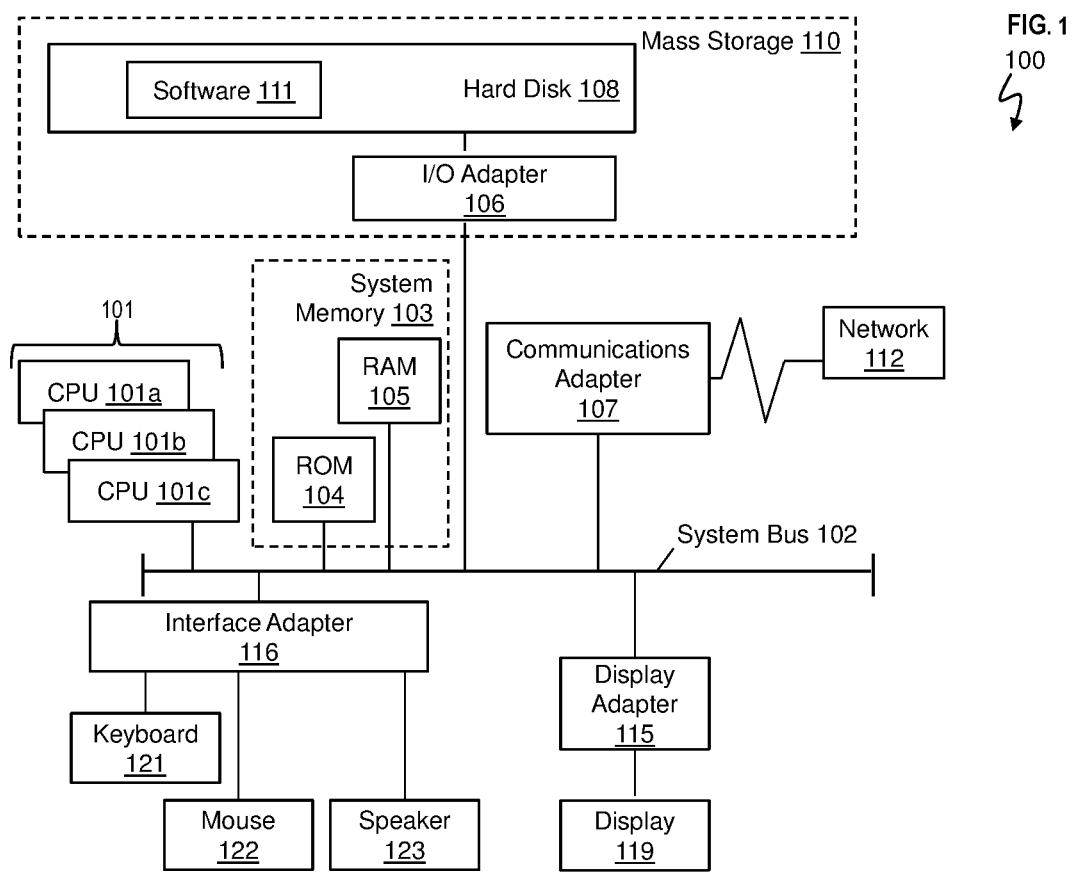
FIG. 1 is a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
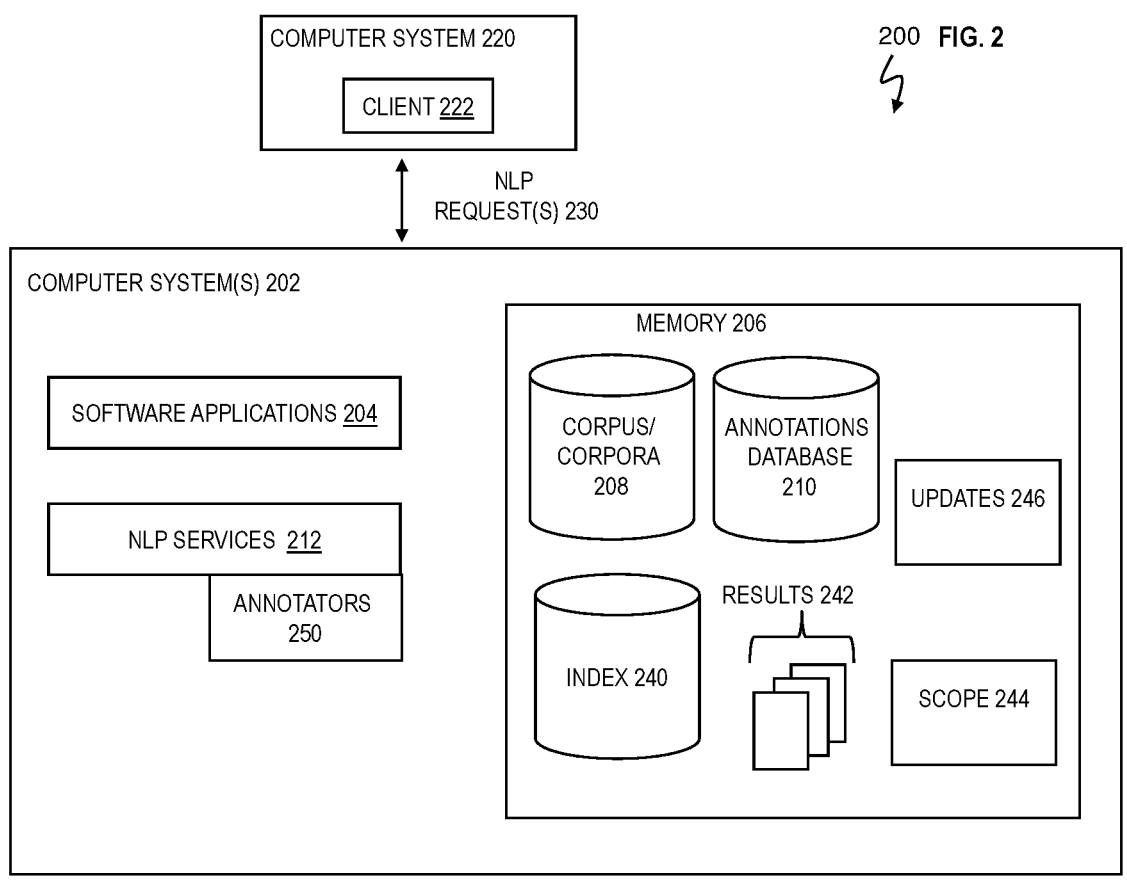
FIG. 2 is a block diagram of a system for targeted partial re-enrichment of a corpus based on a natural language processing model enhancement in accordance with one or more embodiments of the present invention.
Figure 3:
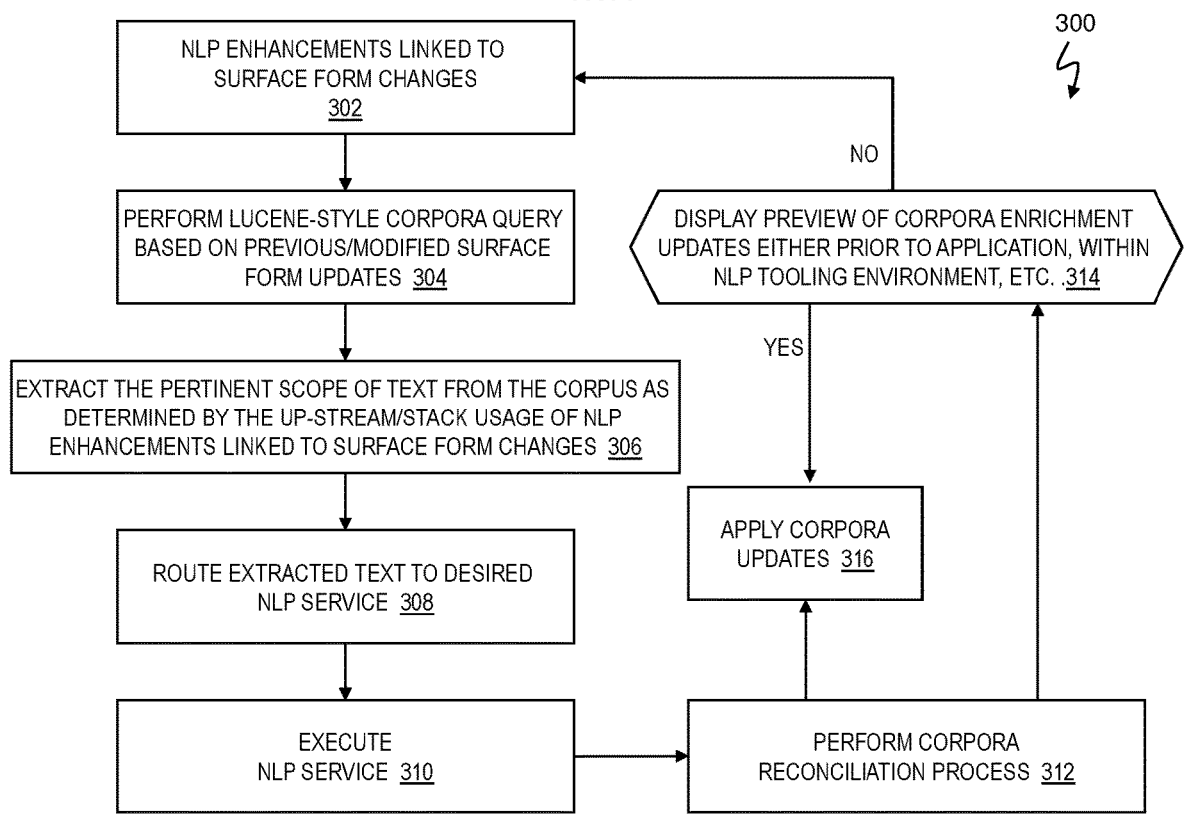
FIG. 3 is a flowchart of a process for targeted partial re-enrichment of a corpus based on a natural language processing model enhancement in accordance with one or more embodiments of the present invention.

FIG. 2 is a block diagram of a system 200 for targeted partial re-enrichment of a corpus based on a natural language processing model enhancement in accordance with one or more embodiments of the present invention. FIG. 3 is a flowchart of a process 300 for targeted partial re-enrichment of a corpus based on a natural language processing model enhancement in accordance with one or more embodiments of the present invention. Re-enriching an entire corpus to take advantage of enhancements to an NLP model is an expensive proposition in terms of time and computational resources. Given NLP model enhancements that can be traced back to surface forms in the text, re-enrichment can occur on a targeted set of passages rather than the entire corpus according to one or more embodiments. FIG. 2 depicts one or more computers systems 202 coupled to computer system 220. Elements of computer system 100 may be used and/or integrated into computers systems 202 and computer system 220.

Process 300 in FIG. 3 will be described below with reference to FIGS. 2 and 3. At block 302, software application 204 on computer system 202 is configured to receive one or more natural language processing (NLP) requests 230. Software application 204 may be implemented as software 111 executed on one or more processors 101. The NLP requests 230 can be made using software application 204 and/or received from computer system 220. The NLP request 230 includes NLP model enhancements which are traced back to surface forms in the text of corpus 208. The NLP model enhancements include updates associated with one or more surface forms of text in corpus 208. The surface form of a word is the form of a word as it appears in the text of corpus 208. In one or more embodiments, NLP model enhancements that can be traced back to specific surface forms within the corpus can be identified within a cognitive tooling platform (e.g., via software application 204 and/or client application 222 of software application 204) while the edits are being made and/or sent to software application 204. Client application 222 may be implemented using software 111 configured to execute on one or more processors 101, as discussed in FIG. 1. Also, software application 204 can determine that the surface forms trace back to text in corpus 208 by indicators or selections made by the creator of NLP requests 230, and these indicators/selections are contained in the NLP requests 230. Example NLP model enhancements can include adding and/or removing surface forms from a dictionary, adding and/or removing building block concepts from attribute sets, etc. Moreover, the NLP model enhancements include any edits that can be linked back to (i.e., identified as) surface forms within the corpus 208.

At block 304, software application 204 on computer system 202 is configured to perform an indexing corpora query in index 240 based on the previous/modified surface form updates from the NLP request 230 in order to index text (e.g., words) in the entire corpus 208. Text, terms, words, etc., may be used interchangeably. All text in the corpus 208 has previously been indexed in index 240, and the indexing corpora query searches the indexed text in index 240. The index 240 is a listing of all text/words (i.e., surface forms) in corpus 208 along with their associated locations in corpus 208. For example, for each text/word in corpus 208, the index 240 may include page numbers, passages, document names, line location, number of mentions of the text/word (surface form), etc. The index 240 is a database index or other search index (i.e., Lucene or elastic search index). In this search style application for index 240, all of the relevant entities extracted by the NLP pipelines (or cartridge) have been indexed to allow for quick look-up by a search application (including software application 204). The indexing corpora query returns query results 242, and these query results 242 are saved in memory 206. Memory 206 may be implemented as mass storage 110 or any other readable storage medium. The query results 242 include which surface forms of the text/words of the NLP model enhancements are found and exactly where (e.g., include page numbers, passages, document names, line location, etc.) these surface forms are found in the corpus 208. As noted above, corpus 208 may contain hundreds, thousands, and/or millions of documents, also referred to as "big data". The query results 242 identify surface forms and specifically where they are located in corpus 208. In one or more embodiments, the index 240 can be a Lucene-style index that is searched using a Lucene-style corpora query. Lucene is an inverted full-text index. This means that it takes all the documents, splits them into words, and then builds an index for each word. Since the index is an exact string-match, the query can be very fast.

At block 306, software application 204 on computer system 202 is configured to use query results 242 to extract the pertinent scope 244 of text/words from the corpus 208 as determined by the upstream/stack usage of NLP enhancements linked to surface form changes. Upstream/stack refers to the application (e.g., software application 204 and/or an application called by software application 204) that utilizes the index 240. There may be an NLP process that only looks for two things (i.e., terms), disease and medications. The index 240 will contain both disease and medication annotations along with the associated corpus documents. For example, using query results 242 for the text/words of the NLP model enhancements, software application 204 analyzes metadata/annotations database 210 to determine which candidate annotations preexisting in metadata/annotations database 210 are impacted by the text/words of the NLP model enhancements linked to surface form changes in corpus 208. The impacted candidate annotations stem back to the surfaces forms in corpus 208 and to the NLP request 230. Also, using query results 242 for the text/words of the NLP model enhancements, software application 204 determines which candidate annotators preexisting in annotators 250 are impacted by the text/words of the NLP model enhancements linked to surface form changes in corpus 208. The impacted candidate annotators may include annotators which originally created the impacted candidate annotations in metadata/annotations database 210, and the impacted candidate annotator used the surface forms of the text in NLP request 230. Additionally, impacted candidate annotators can be associated with other passages, documents, and/or pages in corpus 208 for other text (and/or concepts) not directly and/or in directly related to surface forms of text in NLP request 230, and therefore the other text (and/or concepts) may not have been identified in query results 242 earlier but is indirectly dependent upon surface forms of the text in NLP request 230. Accordingly, the scope 244 may include: (1) identification of the impacted candidate annotations present in metadata/annotations database 210 (where impacted candidate annotations can be directly and/or indirectly associated with surface forms of text in NLP request 230/query results 242); (2) identification of the impacted candidate annotators in annotators 250 (where impacted candidate annotators can be directly and/or indirectly associated with surface forms of text in NLP request 230/query results 242); (3) identification of query results 242 and/or information of query results 242; and identification of precise locations of which passages and documents in corpus 208 (for the surface forms of text in NLP request 230/query results 242) that need to be reprocessed or re-enriched. In other words, the identified candidate annotations and the identified candidate annotators are affected by changes made by the NLP model enhancements.

At block 308, software application 204 on computer system 202 is configured to route the extracted scope 244 for the text/words of the NLP model enhancements to the desired one of the NLP services 212. There can be various types of NLP services 212 on one or more computer system 202. Some NLP services 212 may have different benefits or tradeoffs. NLP services can parse text using annotators 250 to find meaning, which is stored in metadata/annotations database 210. Software application 204 on computer system 202 is configured to cause the NLP service 212 to be executed (only) for the parts of the corpus 208 related to the scope 244 at block 310. The scope 244 details which specific portions or documents of the corpus 208 need to be reprocessed without having to reprocess the entire corpus 208, locations in the portions/documents that the reprocessing needs to occur over, the particular impacted candidate annotations in metadata/annotations database 210 that are affected, and the impacted candidate annotators in annotators 250 that are affected. As such, the entirety of 208 does not require reprocessing.

At block 312, software application 204 on computer system 202 is configured to receive the output from the NLP service 212 for scope 244 and perform a corpora reconciliation process using the output to generate corpora updates 246, resulting in corpora updates 246 stored temporarily in memory 206. The corpora updates 246 include new and/or updated annotations to be made in metadata/annotations database 210 and how these new and/or updated annotations change existing metadata/annotations 210. At block 314, the updates 246 can be previewed by an operator on a display screen (e.g., display 119) before applying the changes to the metadata/annotations database 210. After approval by the operator using software application 204 and/or if preview is skipped, software application 204 on computer system 202 is configured to apply/commit the updates 246 to the metadata/annotations database 210 (only) for the scope 244 at block 316. If the operator does not approve of the updates 246, the operator can modify the NLP enhancements (e.g., using software application 204) and flow returns to block 302.

The techniques and systems discussed herein provide various technical benefits. According to one or more embodiments, when ready to re-enrich the metadata/annotations database 210 with updates 246 corresponding to the enhanced NLP model, the documents/passages identified as being impacted by the NLP model enhancements are reprocessed by the NLP service, and those documents/passages are re-enriched with the model updates. Any previous annotations (in metadata/annotations database 210) over those documents/passages in corpus 208 may be truncated and/or replaced with annotations in updates 246 resulting from the enhanced NLP model. If there are paragraph or document level rules in metadata/annotations database 210, those broader scopes can be re-enriched rather than just the sentence/passage or one could elect to re-enrich the document. When previewing the result of NLP model enhancements associated with the corpus 208 prior to re-enrichment, the re-enriched passages are stored in memory 206 or persisted outside the metadata/annotations database 210 for the purposes of previewing that changes that would occur in metadata/annotations database 210 should the corpus 208 be enriched with the enhanced model. Operators can leverage this preview capability as a means of refining their enhancements should the enhancements yield undesirable results. They can do this quickly without having to wait for and/or needing the entire corpus to be re-enriched.

Figure 4:
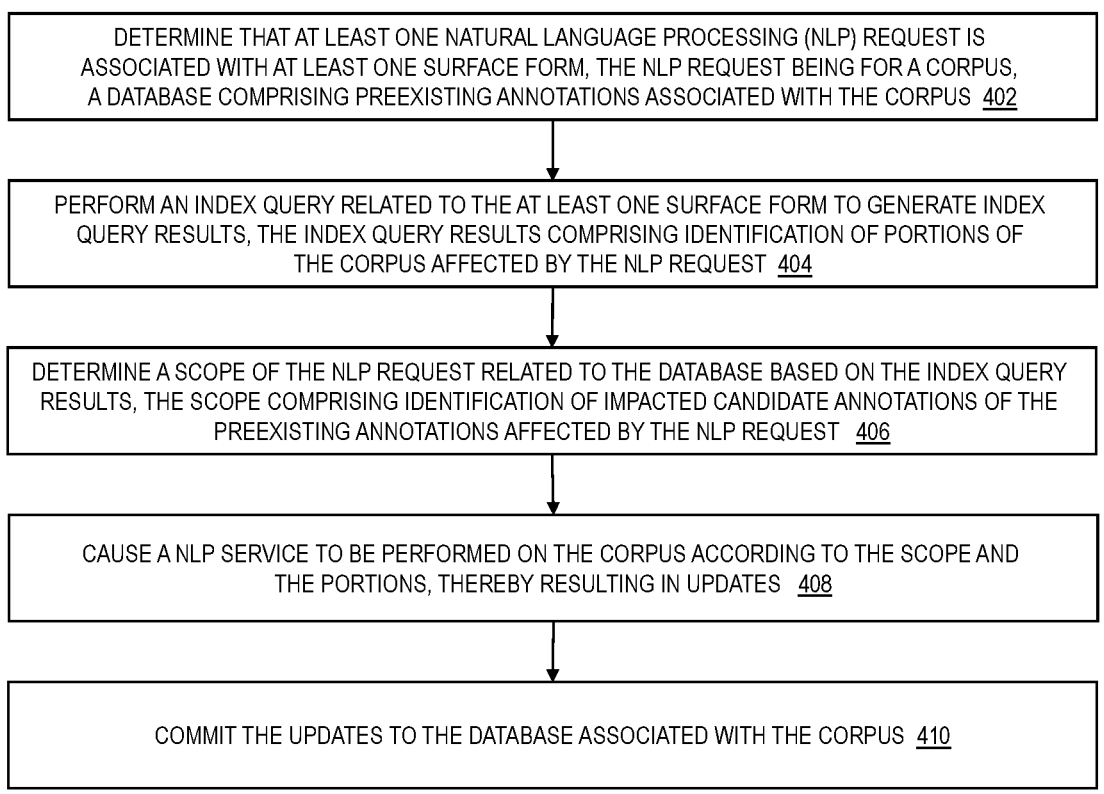
FIG. 4 is a flowchart of a computer-implemented method for targeted partial re-enrichment of a corpus in accordance with one or more embodiments of the present invention.

FIG. 4 is a flowchart of a computer-implemented method 400 for targeted partial re-enrichment of a corpus 208 based on natural language processing model enhancements according to one or more embodiments. At block 402, software application 204 on computer system 202 is configured to determine that at least one natural language processing (NLP) request 230 is associated with at least one surface form, the NLP request 230 being for a corpus 208, a database (e.g., metadata/annotations database 210) including preexisting annotations associated with the corpus 208. At block 404, software application 204 on computer system 202 is configured to perform an index query related to the at least one surface form to generate index query results 242, the index query results 242 including identification of portions of the corpus 208 affected by the NLP request 230. At block 406, software application 204 on computer system 202 is configured to determine a scope 244 of the NLP request 230 related to the database (e.g., metadata/annotations database 210) based on the index query results 242, the scope 244 including identification of impacted candidate annotations of the preexisting annotations (e.g., in metadata/annotations database 210) affected by the NLP request 230. At block 408, software application 204 on computer system 202 is configured to cause a NLP service (e.g., one of the NLP services 212) to be performed on the corpus 208 according to the scope 244 and the portions (e.g., identified in index query results 242), thereby resulting in updates 246. At block 410, software application 204 on computer system 202 is configured to commit the updates 246 to the database (e.g., metadata/annotations database 210) associated with the corpus 208.

Software application 204 on computer system 202 is configured to visually display a preview of the updates 246 prior to committing the updates to the database. The corpus 208 includes the at least one surface form. The portions of the corpus 208 affected by the NLP request include identification (e.g., of the locations) of at least one or more documents from a plurality of documents in corpus 208. The portions of the corpus 208 affected by the NLP request include identification (e.g., of the locations) of at least one or more passages in documents in the corpus 208. The updates 246 include new annotations according to the NLP request 230. The updates 246 include new annotations and modifications to the impacted candidate annotations according to the NLP request 230. Causing the NLP service (e.g., NLP service 212) to be performed on the corpus 208 according to the scope 244 and the portions occurs in a shorter amount of time as compared to causing the NLP service to be performed over an entirety of the corpus 208. The performing the index query and the determining the scope enable unilaterally provisioning computing capabilities for the committing the updates to the database associated with the corpus.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
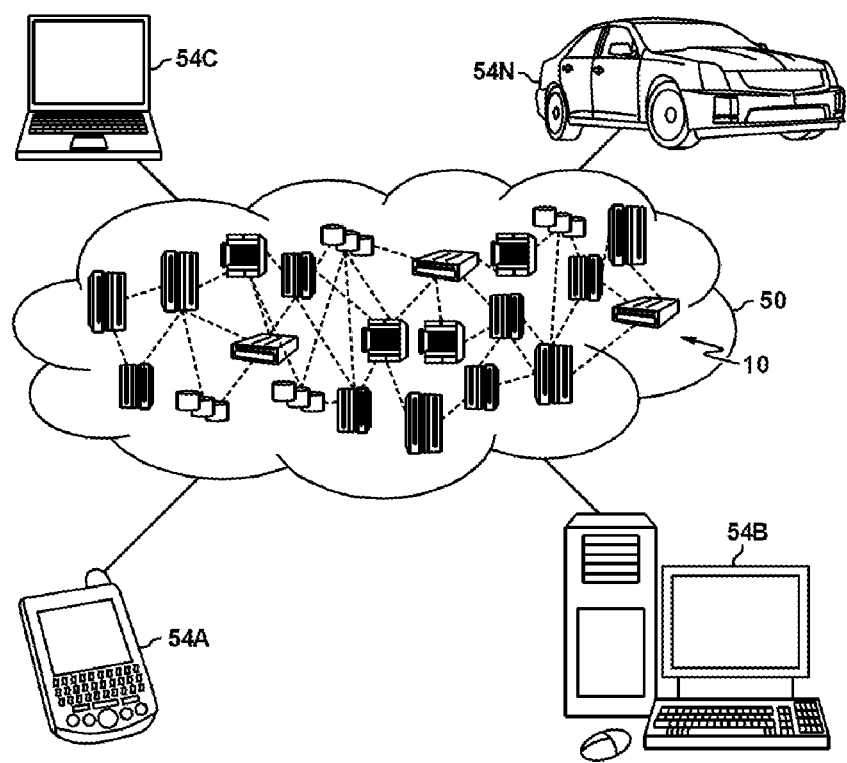
FIG. 5 depicts a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
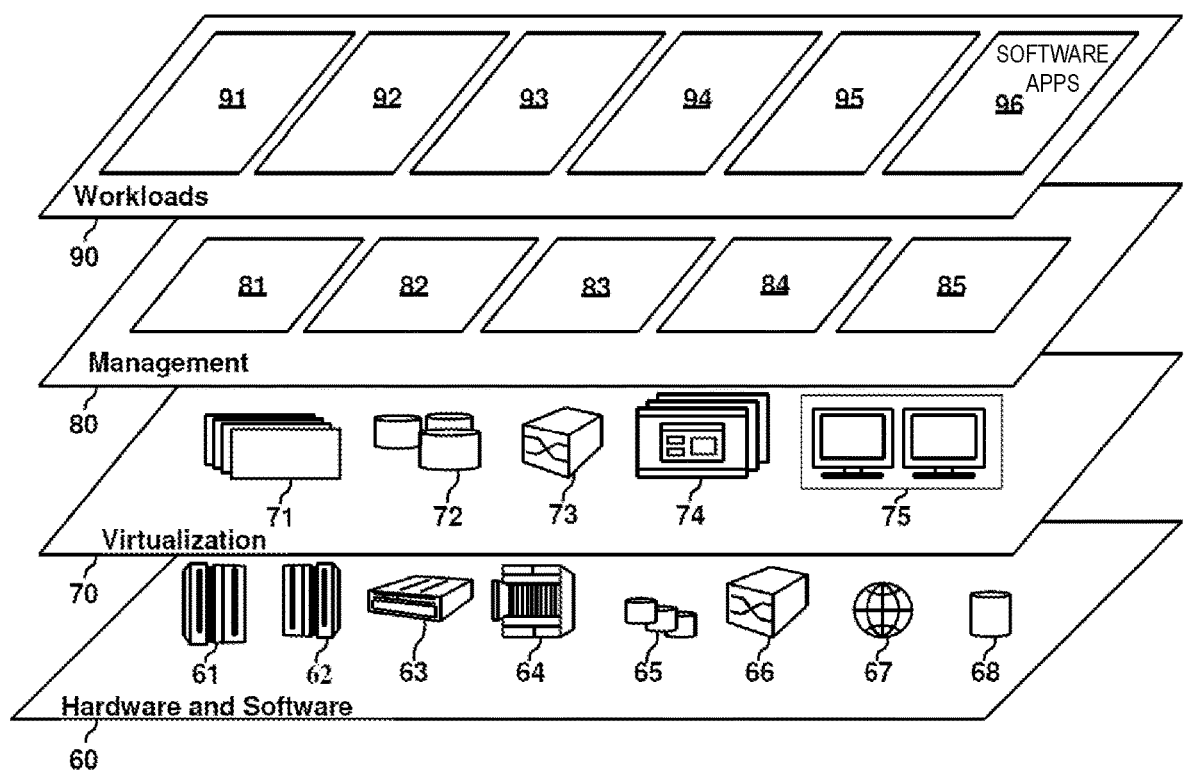
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 204) implemented in workloads and functions 96. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    determining that at least one natural language processing (NLP) request is associated with at least one surface form, the NLP request being for a corpus, a database comprising preexisting annotations associated with the corpus, the NLP request comprising model enhancements that are traced back to the at least one surface form in a text of the corpus;
    performing an index query related to the at least one surface form to generate index query results, the index query results comprising identification of portions of the corpus affected by the NLP request;
    determining a scope of the NLP request related to the database based on the index query results, the scope comprising identification of impacted candidate annotations of the preexisting annotations affected by the NLP request;
    causing a NLP service to be performed on the corpus according to the scope and the portions, thereby resulting in updates; and
    committing the updates to the database associated with the corpus.

2. The computer-implemented method of claim 1, further comprising displaying a preview of the updates prior to committing the updates to the database.

3. The computer-implemented method of claim 1, wherein the corpus comprises the at least one surface form.

4. The computer-implemented method of claim 1, wherein the portions of the corpus affected by the NLP request comprise identification of at least one or more documents from a plurality of documents in the corpus.

5. The computer-implemented method of claim 1, wherein the portions of the corpus affected by the NLP request comprise identification of at least one or more passages in documents in the corpus.

6. The computer-implemented method of claim 1, wherein the updates comprise new annotations.

7. The computer-implemented method of claim 1, wherein the updates comprise new annotations and modifications to the impacted candidate annotations.

8. The computer-implemented method of claim 1, wherein causing the NLP service to be performed on the corpus according to the scope and the portions occurs in a shorter amount of time as compared to causing the NLP service to be performed over an entirety of the corpus.

9. The computer-implemented method of claim 1, wherein the performing the index query and the determining the scope enable unilaterally provisioning computing capabilities for the committing the updates to the database associated with the corpus.

10. A system comprising:
    a memory having computer readable instructions; and
    one or more processors for executing the computer readable instructions, the computer readable instructions controlling the one or more processors to perform operations comprising:
        determining that at least one natural language processing (NLP) request is associated with at least one surface form, the NLP request being for a corpus, a database comprising preexisting annotations associated with the corpus, the NLP request comprising model enhancements that are traced back to the at least one surface form in a text of the corpus;
        performing an index query related to the at least one surface form to generate index query results, the index query results comprising identification of portions of the corpus affected by the NLP request;
        determining a scope of the NLP request related to the database based on the index query results, the scope comprising identification of candidate impacted annotations of the preexisting annotations affected by the NLP request;
        causing a NLP service to be performed on the corpus according to the scope and the portions, thereby resulting in updates; and
        committing the updates to the database associated with the corpus.

11. The system of claim 10, further comprising displaying a preview of the updates prior to committing the updates to the database.

12. The system of claim 10, wherein the corpus comprises the at least one surface form.

13. The system of claim 10, wherein the portions of the corpus affected by the NLP request comprise identification of at least one or more documents from a plurality of documents in the corpus.

14. The system of claim 10, wherein the portions of the corpus affected by the NLP request comprise identification of at least one or more passages in documents in the corpus.

15. The system of claim 10, wherein the updates comprise new annotations, modifications to the impacted candidate annotations, or both.

16. The system of claim 10, wherein causing the NLP service to be performed on the corpus according to the scope and the portions occurs in a shorter amount of time as compared to causing the NLP service to be performed over an entirety of the corpus.

17. A computer program product comprising a computer readable storage medium having program instructions embodied therewith, the program instructions executable by a processor to cause the processor to perform operations comprising:
    determining that at least one natural language processing (NLP) request is associated with at least one surface form, the NLP request being for a corpus, a database comprising preexisting annotations associated with the corpus, the NLP request comprising model enhancements that are traced back to the at least one surface form in a text of the corpus;
    performing an index query related to the at least one surface form to generate index query results, the index query results comprising identification of portions of the corpus affected by the NLP request;
    determining a scope of the NLP request related to the database based on the index query results, the scope comprising identification of candidate impacted annotations of the preexisting annotations affected by the NLP request;
    causing a NLP service to be performed on the corpus according to the scope and the portions, thereby resulting in updates; and
    committing the updates to the database associated with the corpus.

18. The computer program product of claim 17, further comprising displaying a preview of the updates prior to committing the updates to the database.

19. The computer program product of claim 17, wherein the corpus comprises the at least one surface form.

20. The computer program product of claim 17, wherein the portions of the corpus affected by the NLP request comprise identification of at least one or more documents from a plurality of documents in the corpus.

* * * * *